(12) United States Patent
Zhang et al.

(10) Patent No.: US 11,382,345 B2
(45) Date of Patent: Jul. 12, 2022

(54) SELENIUM-RICH WHEAT WHOLE-SPROUT JUICE BEVERAGE AND METHOD FOR PREPARATION THEREOF

(71) Applicants: Guiqin Zhang, Beijing (CN); Zhentong Xu, Beijing (CN); Ruxin Leng, Beijing (CN); Kaiping Qiu, Beijing (CN); Jinchen Liu, Beijing (CN)

(72) Inventors: Guiqin Zhang, Beijing (CN); Zhentong Xu, Beijing (CN); Ruxin Leng, Beijing (CN); Kaiping Qiu, Beijing (CN); Jinchen Liu, Beijing (CN)

( * ) Notice: Subject to any disclaimer, the term of this patent is extended or adjusted under 35 U.S.C. 154(b) by 173 days.

(21) Appl. No.: 16/793,319

(22) Filed: Feb. 18, 2020

(65) Prior Publication Data
US 2020/0196638 A1    Jun. 25, 2020

Related U.S. Application Data

(60) Division of application No. 15/135,553, filed on Apr. 22, 2016, now abandoned, which is a continuation of
(Continued)

(30) Foreign Application Priority Data

Oct. 28, 2013    (CN) .......................... 201310515096.0

(51) Int. Cl.
*A23L 2/52*    (2006.01)
*A23L 2/04*    (2006.01)
(Continued)

(52) U.S. Cl.
CPC .................................... *A23L 2/52* (2013.01); *A23L 2/04* (2013.01); *A23L 2/38* (2013.01); *A23L 33/16* (2016.08); *A23V 2002/00* (2013.01)

(58) Field of Classification Search
None
See application file for complete search history.

(56) References Cited

U.S. PATENT DOCUMENTS 8,778,418 B2    7/2014  Bisterfeld Von Meer
2010/0316768 A1 *  12/2010  Stillman ............ A61K 2300/00
426/61
(Continued)

FOREIGN PATENT DOCUMENTS

CN    101015372 A    8/2007
CN    101147461 A    3/2008
(Continued)

OTHER PUBLICATIONS

Detox Juices, Dec. 3, 2011 by Steve T. These detox juices are too valuable not to be shared with nobody else, accessed at http://heartattackstrokeomega3.com/tag/detox-juices/ (STEVE).*
(Continued)

*Primary Examiner* — Donald R Spamer
*Assistant Examiner* — Philip A Dubois

(57) ABSTRACT

The present invention discloses a selenium-enriched wheat whole bud seedling juice drink and a preparation method thereof. The selenium-enriched wheat whole-seedling juice drink comprises the following raw materials in parts by weight: 60-120 parts of selenium-enriched wheat whole bud seedlings, 0-50 parts of selenium-enriched wheat seedling leaves, 250-1000 parts of mineral water, and 5-15 parts of fresh ginger slices, wherein the selenium content of the selenium-enriched wheat whole bud seedlings is 0.15-0.25 mg/kg; and the selenium content of the selenium-enriched wheat whole bud seedling juice drink is 0.01-0.05 mg/L.

1 Claim, 1 Drawing Sheet

Related U.S. Application Data application No. PCT/CN2014/088118, filed on Oct. 8, 2014.

(51) Int. Cl.
*A23L 33/16* (2016.01)
*A23L 2/38* (2021.01)

(56) References Cited

U.S. PATENT DOCUMENTS

2013/0011520 A1 1/2013 Wang
2013/0295256 A1 11/2013 Shi

FOREIGN PATENT DOCUMENTS

CN 102138539 A 8/2011
CN 103535818 A 1/2014

OTHER PUBLICATIONS

Bio Wheatgrass, accessed at http://wheatgrasssecrets.blogspot.com/2009/11/bio-wheatgrass.html, Sunday Nov. 8, 2019.*
Internation Search Report of PCT/CN2014/088118, dated Jan. 13, 2015.
Jiao, Yuzhi; "Development of Selenium-Rich Wheat Seedling Vinegar Drink", The 1-7 Food Industry, 2011 , No. 10, Oct. 31, 2011 (Oct. 31, 2011), pp. 25-26.

* cited by examiner

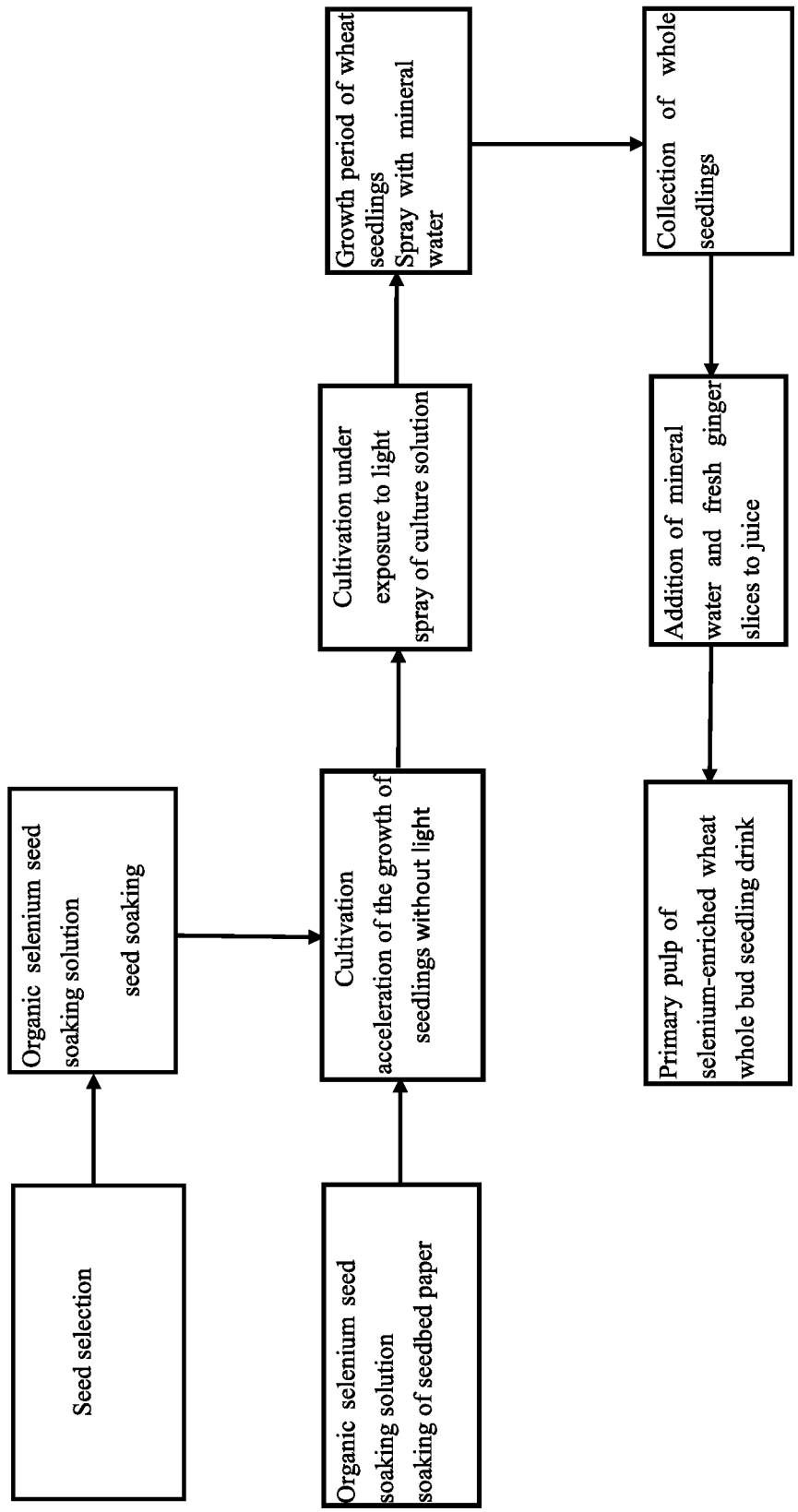

SELENIUM-RICH WHEAT WHOLE-SPROUT JUICE BEVERAGE AND METHOD FOR PREPARATION THEREOF

CROSS-REFERENCE TO RELATED APPLICATIONS

This application is a division of U.S. utility application Ser. No. 15/135,553 with a filing date Apr. 22, 2016, now pending, which is a continuation of International Patent Application No. PCT/CN2014/088118 with a filing date of Oct. 8, 2014, designating the United States, and further claims priority to Chinese Patent Application No. 20131051096.0 with a filing date of Oct. 28, 2013. The content of the aforementioned applications, including any intervening amendments thereto, are incorporated herein by reference.

TECHNICAL FIELD

The present invention relates to a drink, in particular to a drink processed by taking selenium-enriched wheat whole bud seedlings as main raw materials and a preparation method thereof.

BACKGROUND OF THE PRESENT INVENTION

The traditional fruit and vegetable drinks are prepared by taking fruits and vegetables as raw materials to be mixed with additives such as sugar, preservatives and antiseptic agents. The production of the raw materials is mainly subjected to the soil cultivation, and in order to acquire higher yield per unit area, the fertilizer is manually applied to guarantee the supply of nutrients necessary for the growth of the fruits and vegetables. Meanwhile, in order to prevent and control pest and disease damage, pesticides are required for comprehensive prevention and control. Firstly, the yield of the vegetables is increased by means of fertilization and pesticide application, thus the residues of pesticides and heavy metals are unavoidable, which is bad for the body health of the eaters. Secondly, in order to prolong the storage period, antiseptic agents and preservatives are added in the majority of the traditional drink production processes. The long-term drinking of the drinks containing these chemical agents is bad for the body health of people.

Only the portion above the rootstock is processed in the existing wheat seedling juice products. The wheat root is considered as an indispensable important portion during the growth of the wheat seedling, but in the existing cultivation process of the wheat seedling, it is generally believed that the nutrient content of the wheat root is decreased after supplying the nutrients necessary for the growth of the seedling leaves, so people lay emphasis on the nutrients of the wheat seedling leaves and neglect the nutrients of the wheat root. When the wheat seedling grows to 10-15 cm, fresh wheat seedling leaves are cut to be juiced, while the wheat roots are abandoned as leftovers, used for waterlogged compost or used as chicken feed. During the cultivation of the wheat seedlings, by means of observation, the applicant discovers that the wheat root grows in a large size, has vigorous growth capacity and can absorb a great amount of water and nutrients, and cells of the root are not only high in division capacity, but also have vacuole, thereby being capable of absorbing and storing a great amount of organic selenium and nutrients. Due to the short growth period of the wheat seedlings, besides the nutrients supplied for the growth of the wheat leaves, the root is still rich in organic selenium and nutrients, which plays a critical role in cultivating the selenium-enriched wheat bud seedlings.

An invention patent application with an application No. of 200510002396 discloses a wheat seedling tea and a preparation method thereof. The wheat seedling tea is prepared by fetching wheat seedlings as high as 20 to 30 cm, and cleaning, sterilizing, grinding, juicing, filtering and drying. In the method, the wheat bud seedlings lose much of nutrients after being dried. The patent provides only the preparation of a juice and a tea. As not whole seedlings are adopted, the wheat seedlings are of low nutritive value and do not contain selenium.

An invention patent with an application No. of 201210055924.2 discloses a mixed beverage prepared from wheat seedlings. The mixed beverage is prepared by mixing and boiling such raw materials as wheat bud seedlings, hawthorns and red dates with water, instead of primary pulp of wheat bud seedlings. The preparation of the product relates to only reaped wheat seedlings, not whole seedlings. A specific cultivation method of wheat bud seedlings suitable for beverage processing is not disclosed. The nutrients of the wheat bud seedlings do not contain selenium, either.

An invention patent with an application No. of 201110063980.6 discloses a dynamic gradient whole-course selenium enrichment method for wheat seedlings, which is a dynamic gradient whole-course selenium-enriched cultivation method for selenium-enriched wheat seedlings. Wheat seeds are soaked in a basic culture solution and a selenium-containing culture solution repeatedly and alternately. After 13 to 18 days when wheat seedlings emerge and grow to 10.5 to 16 cm, the wheat seedlings are cut off from the position 1 cm away from the roots. In order that the growth process of the wheat seedlings adapts to the selenium enrichment process, the wheat seedlings are cultivated in the basic culture solution and the selenium-containing culture solution repeatedly and alternately. Through the dynamic gradient whole-course selenium enrichment method and constant change of selenium concentration in the selenium-containing culture solution, a great amount of organic selenium is enriched in the wheat seedlings, and the bud ratio, emergence rate and yield of the wheat seedlings are increased. The selenium enrichment method of the patent consumes a large amount of culture solution, provides a complicated operation process, and increases production cost.

An invention patent with an application No. of 201210290101.8, as well as many other patents, discloses a high-selenium wheat kernel and a production method thereof. The method is totally different from the wheat bud seedling selenium enrichment method of the present invention.

SUMMARY OF PRESENT INVENTION

The present invention provides a selenium-enriched wheat whole bud seedling juice drink and a preparation method thereof to solve the technical problems of low nutrient, poor health effect and poor mouth feel in the existing wheat bud seedling juice drink as well as the technical problem of easy loss of wheat bud seedling juice nutrients by a traditional manufacturing technology.

The present invention adopts the technical solution for solving the technical problems:

The selenium-enriched wheat whole bud seedling juice drink comprises the following raw materials in parts by weight:

| | |
|---|---|
| Selenium-enriched wheat whole bud seedlings | 60-120 parts; |
| Selenium-enriched wheat seedling leaves | 0-50 parts; |
| Mineral water | 250-1000 parts; |
| Fresh ginger slices | 5-15 parts; | wherein the selenium content of the selenium-enriched wheat whole bud seedlings is: 0.15-0.25 mg/kg;

wherein the selenium content of the selenium-enriched wheat whole bud seedling juice is: 0.01-0.05 mg/L.

The selenium-enriched wheat whole bud seedling is obtained by the following seed breeding method and cultivation method:

A. The breeding method of a wheat seed is as follows:

In a high-altitude pollution-free region, the seed is bred by means of the characteristics of strong illumination and large diurnal temperature difference to form a wheat seed with rich nutrients; after collected, the seed is stored in an environment of 0-4° C.;

B. The cultivation method of the selenium-enriched wheat whole bud seedling is as follows:

a. seed selection: impurities are removed from the seed to eliminate seeds having damaged surfaces and wizened seeds so as to select clean, pollution-free and plump wheat seeds with high sprouting rate;

b. seed soaking: the selected wheat seeds are soaked in an organic selenium seed soaking solution; the organic selenium seed soaking solution comprises the following raw materials in parts by weight: 1000 parts of mineral water and 1-3 parts of organic chelating water-soluble selenium;

c. sprouting: after being soaked, the seeds can be sprouted; the seeds are taken out of the organic selenium seed soaking solution, packed with clean ventilated soft cloth and placed at weak light position for sprouting; the seeds are required to be washed with the mineral water daily; then, the seeds are soaked again in the organic selenium seed soaking solution; after being soaked for 1-12 hours, the seeds are packed with the ventilated soft cloth; after 60% of the seeds sprout in 3-5 days, the seeds can be sowed;

d. acceleration of the growth of seedlings: seedbed paper soaked with the organic selenium seed soaking solution is laid on a seedling disk; after absorption, the seedbed paper is in a saturation state; the sprouted wheat seeds are uniformly scattered on the seedbed paper; after the seeds are bred, the same seedling disk is placed on the seeds or a piece of same seedbed paper wetted by spraying with a sprinkling can is covered on the seeds to maintain humidity; the seeds are required to be protected from light during acceleration of the growth of seedlings; meanwhile, ventilation of the seedling disk is required; during acceleration of the growth of seedlings, the sprouted seeds are uniformly sprayed with the mineral water daily at least once; the spraying quantity shall be in such a manner that the seedbed paper at the bottom of the disk is wet without accumulated water; when buds of the wheat bud seedlings grow to 1 cm, the seedbed paper covered on the buds are removed to performing cultivation under exposure to light; the temperature is 15-30° C. during the cultivation; on the next day after exposure to the light, the wheat bud seedlings are sprayed with an organic selenium spraying culture solution; the humidity of the seedbed paper is maintained; the organic selenium spraying culture solution comprises the following raw materials in parts by weight: 1000 parts of mineral water and 0.5-2 parts of kappa-selenocarrageenan; then, the wheat bud seedlings are sprayed daily with mineral water;

e. collection: the growth time of the wheat bud seedlings is controlled as 10-15 days; and wheat whole seedlings are collected when the height of the seedlings is 10-12 cm to obtain the selenium-enriched wheat whole bud seedlings.

The water temperature and the time of seed soaking are set according to different seasons; the water temperature in winter is required to be 40-45° C.; the water temperature of seed soaking in other seasons is normal temperature; and the seed soaking time is: 10-13 hours in winter, 6-8 hours in summer and 9-11 hours in spring and autumn.

During seed soaking, the seeds are washed daily twice in summer and once in other seasons.

The optimal sprouting temperature is 15-25° C.

The sowing density in acceleration of the growth of seedlings is: for 250 g of dry wheat seeds, 2-3 plastic disks of 25 cm×30 cm of seeds are sowed.

During acceleration of the growth of seedlings, the sprouted seeds are uniformly wetted daily three to four times in summer and 1 to 2 times in winter.

A preparation method of the selenium-enriched wheat whole bud seedling juice drink comprises the following preparation steps:

step 1: after being collected, the mature selenium-enriched wheat whole bud seedlings and the selenium-enriched wheat seedling leaves are washed with the mineral water for standby;

step 2: the selenium-enriched wheat whole bud seedlings, the selenium-enriched wheat seedling leaves, the mineral water and the fresh ginger slices are put into a juice extractor in proportion, and the extracting time is 1-3 minutes;

step 3: the extracted and filtered selenium-enriched wheat whole bud seedling juice drink is taken out and placed in an environment of 0-4° C. for storage.

The beneficial effects of the present invention are as follows:

According to the present invention, the selenium-enriched wheat whole bud seedlings are used as main raw materials, matched with fresh ginger slices and the mineral water, and tested on the formula proportions and production techniques of the wheat bud seedling drinks for three years. The prepared raw stock of the drink is a green organic selenium product. The selenium-enriched wheat whole bud seedlings are high in selenium content and beneficial to human health. Mineral substances in the mineral water are capable of exerting a synergistic effect with organic selenium, and generating an important influence on the growth and development as well as nutrient absorption and allocation of wheat. The selenium-enriched wheat whole bud seedlings are matched with the fresh ginger, thereby neutralizing the cold property of the wheat bud seedling juice, and are good in health effect and taste. The cost of the raw materials can also be decreased while the content of the effective ingredients is increased in a manner of whole-seedling juicing, thereby achieving good economic benefits. The selenium-enriched wheat whole bud seedlings are collected in vivo for immediate use, thus no loss of the nutritional ingredients in the wheat bud seedlings can be ensured. The selenium-enriched wheat whole bud seedlings can be added at any time during a food processing process according to the processing number of food, thereby ensuring the freshness and nutrition of the drink. The drink disclosed by the present invention is reasonable in proportion, rich in nutrition, and fresh and unique in taste, as well as enriches varieties of wheat bud seedling juice drinks.

In the selenium-enriched wheat whole bud seedling of the present invention, wheat seeds bred in high attitude areas are selected, and a storage environment is controlled, so that no pollution and high bud rate of wheat bud seedling seeds can be effectively ensured. The selenium-enriched wheat whole seedling of the prevent invention is produced through an indoor planting method, and is cultivated in a non-soil, non-pesticide and non-pollution condition, thereby breaking the traditional field planting mode to perform non-soil and stereoscopic blanching cultivation. The selenium-containing wheat seedling takes a wheat seedling as an active carrier for selenium transformation, successfully enables selenium to be enriched in wheat buds, wheat roots and wheat seedlings by controlling different absorption and transformation functions and effects during wheat sprouting, rooting and seedling leaf growth, and is combined with molecules of amino acid, protein, etc. contained in the wheat whole seedling to enable selenium to be enriched on the molecules of amino acid, protein, etc., thereby obtaining a wheat whole seedling rich in natural organic selenium. The cultivation method of the selenium-enriched wheat whole bud seedling is simple, easy in operation, and suitable for household and industrial production.

In the present invention, three selenium enrichment technical methods of seed soaking, absorption of seedbed paper and spray of initial bud (1 cm) period are adopted to achieve that the wheat bud seedling contains rich organic selenium. Mineral water is also adopted for whole-course breeding of the wheat whole seedling. The whole seedling (containing a wheat root and wheat leaves) is juiced, thereby not only maintaining effective nutrients contained in the wheat seedling leaves, but also fully utilizing the wheat bud root which is originally discarded, fully utilizing the nutrients contained in the root, increasing the kinds and content of the nutrients of the whole seedling, increasing the juice yield, reducing production cost, and increasing economic benefits. The present invention reserves an original ecological breeding method and effective nutrients of the wheat bud seedling while distinguishing the existing breeding method and cultivation method of the wheat bud seedling. The product is rich in many vitamins mineral substances, and has high selenium content.

In the present invention, the selenium enrichment technical methods of seed soaking, absorption of seedbed paper and spray of initial bud (1 cm) period are adopted to achieve that the wheat bud seedling contains organic selenium. The principles are environmental protection and safety first. The quality index of the product is determined by referring to related national standards and related industrial regulations. The wheat whole seedling itself has the advantages of safe eating, no toxicity and side effect, high absorption and utilization rates, high nutrient value (e.g., high-level vitamins, high-quality protein, etc.) and the like. In addition, the barley green in the wheat whole seedlings is already widely known and developed into many forms of nutritional products. Primarily because the barley green is rich in such substances as protein, lactoflavin, β-carotene, vitamin C, vitamin E, potassium, calcium, chlorophyll, superoxide dismutase (SOD), etc., the barley green has the effects of resisting oxidation, resisting fatigue, reducing blood lipid and blood sugar, protecting gastric mucosa, etc. That is why a malt is considered by traditional Chinese medicine as a good medicine having the pharmacological actions of promoting digestion, invigorating the stomach, stopping milk secretion, relieving flatulence, etc. The synergy effect between the barley green and the selenium achieves complementarity so that the selenium-enriched wheat whole seedlings have strong physiological activity so various trace elements including selenium are easier to be absorbed by a human body. In the present invention, through a low-temperature juicing technology, an entire wheat whole seedling is juiced. The juice is mild in property and extremely easy to be absorbed by the human body, has an absorption rate as high as more than 99%, and is a selenium-containing green organic drink having comprehensive nutrition.

In addition, when the wheat whole-seedling juice drink is prepared by the present invention, a proper quantity of wheat seedling leaves are added, thereby maintaining the nutrients and the functions of chlorophyll and barley green, adjusting the appearance of the wheat whole-seedling juice drink and satisfying the need of different drinkers.

In the overall process of growth and breeding of the wheat whole seedlings in the present invention, the mineral water is adopted for soaking, watering and spraying for increasing such mineral substances as calcium, iron, manganese, phosphorus, sodium, cobalt, zinc, etc. contained in the wheat whole seedlings to become a treasure house of the mineral substances. For example, potassium ions play an obvious action for improving constipation and indigestion, promoting intestinal peristalsis, maintaining the strength of cardiac muscle and whole muscle and many other aspects. The wheat whole-seedling juice is natural alkaline food. The alkaline degree of the wheat whole-seedling juice is higher than that of spinach having the highest alkali (39.6) in vegetables by nearly one time (66.4), and the wheat whole-seedling juice is the best food for correcting acidic physique. The wheat whole-seedling juice is free of sugar, milk, artificial colors, spice, preservative and chemical residues, and is rich in such nutrients as natural organic protein, vitamin E, flavonoid, etc. and a large number of enzymes. Especially, the synergy effect of natural component, i.e., vitamin E and selenium in the wheat whole seedlings enables the product to have strong physiological activity to achieve a better absorption effect. The wheat seedlings are cold in nature and sweet and salty in taste, and is attributed to spleen and stomach meridians. If served frequently, the wheat seedlings perform the functions of benefiting qi, relieving epigastric distention, quenching thirst, removing fever, stopping milk secretion, etc. Meanwhile, the wheat seedlings may enhance physical ability and energy, remove constipation, improve sleep quality, resist all kinds of ulcer, decrease blood sugar and blood fat, regulate blood pressure and accelerate rehabilitation from a surgery, external skin injury and some infections, having strong effects of diminishing inflammation and alleviating pain; the wheat seedlings may increase immunity, enhance memory, eliminate halitosis and body odor, help to treat climacteric syndrome, and have a certain curative effect on toxic symptom caused by medical therapy.

The seed breeding method and cultivation method of the selenium-enriched wheat whole bud seedlings of the present invention are obviously different from the existing wheat bud seedling breeding method and cultivation method.

1. In the present invention, during seed soaking, an especially prepared organic selenium seed soaking solution is adopted, and organic chelating water-soluble selenium is selected (Changsha Longnong Agricultural Science and Technology Development Co., Ltd); and the organic chelating water-soluble selenium has no side effect. Moreover, the mineral water is used as a diluent. Because the mineral water contains many mineral substances and trace elements, after the organic selenium is added, the mineral substances in the mineral water generates a synergy effect with the organic selenium and generates an important influence on growth and development of wheat and absorption and distribution of nutrients. After the seeds are soaked with the organic selenium seed soaking solution, the interaction between the mineral substances and the organic selenium can obviously increase the sprouting rate of the seeds and obviously promote development of root system and growth of the leaves. After the seeds are soaked, a sufficient quantity of organic selenium is absorbed and wheat husks become soft, thereby providing sufficient nutrition for sprouting of the seeds and establishing a foundation for development and growth of the selenium-enriched wheat seedlings.

2. In the present invention, after the seedbed paper is soaked with the organic selenium culture solution, the seedbed paper is laid on the seedling disk. The sprouted wheat seeds are uniformly scattered on the paper. After the seeds are bred, the same seedling disk is placed on the seeds or a piece of same seedbed paper wetted by spraying with a sprinkling can is covered on the seeds to maintain humidity; and the bud seedlings at the breeding stage start to grow. Moreover, the period is the most vigorous stage of root development. Cells at the root are rapidly divided to grow. At this moment, except that the nutrients of the wheat seeds themselves have the function of ensuring normal development of buds, the wheat seeds can quickly and continuously absorb the organic selenium from the organic selenium culture solution absorbed from the seedbed paper. Under dual functions of the nutrients of the wheat seeds and the organic selenium, growth and development of malt root are promoted. Because the structure of the bud root can greatly absorb and store the organic selenium, growth and selenium enrichment of the wheat leaves are effectively promoted and ensured. By means of the technical methods of seed soaking of the organic selenium, soaking of the seedbed paper and spray, the purpose of increasing the selenium content of the wheat whole bud seedlings is simply realized and the original ecological breeding method and effective nutrients of the wheat bud seedling juice are reserved.

The organic selenium spraying culture solution is prepared from kappa-selenocarrageenan (Wuhan Yuancheng Group Medicine Co., Ltd). The organic selenium spraying culture solution comprises the following raw materials in parts by weight: 1000 parts of mineral water and 0.5-2 parts of kappa-selenocarrageenan, and has the characteristics of no side toxic effect and good selenium enrichment effect. The spray of wheat bud seedlings is controlled on the next day of the acceleration period of growth of wheat seedlings instead of direct spray on the leaf surfaces, thereby ensuring the characteristics of the wheat bud seedlings of selenium enrichment and no toxicity, realizing the organic breeding process of selenium enrichment of the wheat bud seedlings and providing reliable guarantee for production of the selenium-enriched whole-seedling organic wheat bud seedling juice drink.

3. The present invention uses wheat whole seedlings to be juiced, wherein wheat root has the main functions of: absorbing water and nutrients from the culture solution and transferring the same into stem leaves to synthesize and transform organic matter in the body, and continuously supplying the needs for growth and development of wheat. The wheat root consists of a radicle and a nodal root. The radicle is also known as a seed root and a primary root. A seedling usually has 3-5 radicles and a maximum of 7 radicles. A large seed has many radicles, while a small seed has fewer radicles. After the first green leaf appears, no new radicle grows. When 2-3 green leaves grow from the wheat, the nodal root grows from nodes of a basal part of a stem. The wheat has many tillers and many nodal roots. It is known from the study on structures and functions of all organs of the wheat that the root structure of the wheat bud seedling has four parts: 1. root cap: the root cap is the leading cap structure of the root tip, is covered outside a meristem region and has the function of protecting a young meristem of the root tip against soil abrasion. The root cap consists of multilayer thin wall cells loosely arranged. The arrangement of the cells is irregular and outer cells is often subjected to mucification. When the root end grows downwards, a lubrication function is performed so that the root tip is easy to cross downwards. The outer cells are often abraded or disintegrated to die, and then come off. However, because the inner meristem region can be continuously divided to generate new cells, cells of the root cap can be successively supplemented and replaced to always maintain certain thickness and shape. In addition, cells of the root cap often contain amyloplasts, and may have the function of gravitational induction, which is relevant to geotropic growth of the root. 2. Meristem region: The meristem region is also known as a growing point, which is a typical top meristem having strong fissionability, is located inside the root cap and has a total length of 1-2 mm. The front part is a promeristem which is not divided, and the back part is a primary meristem which can continuously perform cell division so as to increase the number of cells of the root tip. Thus, the root continuously performs primary growth. The cells have the shape of polyhedrons. The polyhedrons are small individuals, are arranged closely, have thin cell wall, large cell nucleus, large density of cytoplasm (no vacuole) and opaque appearance. 3. Elongation region: The elongation region is located in the back part of the meristem region. Most of cells gradually stop dividing and small vacuoles are generated (formed by absorbing water) so that the cell volume is increased and the cells are obviously extended along the long axis direction of the root, generally about 2-5 mm. The elongation region is a primary region of forward advance and has transparent, white and smooth appearance. 4. Maturation region: The maturation region is also known as a root hair region. Various cells in the region stop extending, generate large vacuoles (formed by merging small vacuoles), and is differentiated and mature to form all kinds of tissue. Cespitose hairs, i.e., root hairs, on the cuticle are major positions for the root to absorb water and organic selenium. With the continuous backward extension of cells in the elongation region of the root tip, new root hairs successively appear to replace withered root hairs to form a new root hair region for continuously extending the absorption area of the root.

In recent years, some scholars deeply research the influence of root breaking on a regulation and control mechanism of wheat growth, root system growth of wheat and a relationship between distribution and overground part, especially root system vitality, content of various endogenous hormones of the root system and the correlation thereof as well as the influence of the endogenous hormones on growth and development of wheat. Research results show that: the relationships between the root system of wheat and the overground part, the gross fresh weight of the root system of wheat and the gross fresh weight of the overground part as well as the nourishment absorption number and the number of the tillers are positive correlations. The contents of the endogenous hormones in the root system and the functional leaves are changed almost synchronously from the beginning of the setting stage of the wheat. It is also found from the research that there is obvious correlativity between different endogenous hormones and between identical endogenous hormones in the root system and the leaves of the wheat. In the present invention, The interaction among the endogenous hormones in the seed itself, the mineral substances in the mineral water and the organic selenium greatly affects growth and development of the wheat and absorption and distribution of nourishment. Especially, the interaction with the organic selenium can obviously promote the growth of the root system, enhance the ITC reduction intensity (vitality) of the root system, promote absorption of nitrogen, phosphorus and potassium in the mineral water by the root system as well as the distribution of nitrogen, phosphorus and potassium to the stem leaves of the wheat, improve the photosynthetic rate of the wheat leaves and SOD, POD and CAT activities of the root system and the wheat leaves and reduce the content of MDA, thereby increasing the capability of a wheat bud seedling plant to withstand peroxidization of membrane lipid and ensuring sufficient photosynthate supply of the wheat leaves.

Due to a special structure and function of the wheat root of the wheat seedling, after an organic selenium liquid is absorbed, in addition to supply of the organic selenium liquid for the seedling leaves to satisfy the growth need, most of the organic selenium liquid remains in the root. The root of the wheat seedling is also rich in nutrition and is an important component of effective ingredients of the selenium-enriched wheat bud seedling juice. Therefore, the whole seedling is juiced, thereby obviously increasing the contents of such effective ingredients as organic selenium, etc. It is tested that the selenium content of the selenium-enriched wheat whole bud seedling is: 0.15-0.25 mg/kg.

It is actually measured in the present invention that the fresh weight of the root of the whole seedling and the fresh weight of the wheat leaves of the wheat seedling have a proportion of about 4:1. Therefore, the yield of juicing primary pulp of the wheat seedling is increased. By taking the root of the wheat seedling as an example, it is measured that the fresh weight of the root of the wheat seedling and the dry weight of the root have a weight ratio of about 10:2, i.e., the juicing quantity at the root of the wheat seedling can be added by 3-4 times. The present invention overcomes a traditional practice of only adopting the parts above the rhizome in the existing wheat seedling juice product, plays the action of a neglected wheat root, and has good economic benefits.

The present invention is suitable for families, corporate canteens and hotels to prepare the drink at any time, and the drink can be prepared according to different age brackets, different jobs, and people with different physical conditions. Long-term drinking is beneficial to health care.

DESCRIPTION OF THE DRAWINGS

The present invention is further described below in combination with the drawings and embodiments.

FIG. 1 is a process flow diagram of a cultivation method of selenium-enriched wheat whole bud seedlings.

DETAILED DESCRIPTION

Embodiment 1 the selenium-enriched wheat whole bud seedling juice drink comprises the following raw materials in parts by weight:

| | |
|---|---|
| Selenium-enriched wheat whole bud seedlings | 70 parts; |
| Selenium-enriched wheat seedling leaves | 30 parts; |
| Mineral water | 400 parts; |
| Fresh ginger slices | 15 parts; |

The selenium content of the selenium-enriched wheat whole bud seedling juice drink is: 0.03±0.005 mg/kg.

Embodiment 2 the selenium-enriched wheat whole bud seedling juice drink comprises the following raw materials in parts by weight:

| | |
|---|---|
| Selenium-enriched wheat whole bud seedlings | 80 parts; |
| Selenium-enriched wheat seedling leaves | 20 parts; |
| Mineral water | 250 parts; |
| Fresh ginger slices | 10 parts; |

The selenium content of the selenium-enriched wheat whole bud seedling juice drink is: 0.048±0.005 mg/kg.

Embodiment 3 the selenium-enriched wheat whole-seedling juice drink comprises the following raw materials in parts by weight:

| | |
|---|---|
| Selenium-enriched wheat whole bud seedlings | 100 parts; |
| Mineral water | 1000 parts; |
| Fresh ginger slices | 15 parts; |

The selenium content of the selenium-enriched wheat whole bud seedling juice drink is: 0.015±0.005 mg/kg.

Embodiment 4 the selenium-enriched wheat whole-seedling juice drink comprises the following raw materials in parts by weight:

| | |
|---|---|
| Selenium-enriched wheat whole bud seedlings | 90 parts; |
| Selenium-enriched wheat seedling leaves | 10 parts; |
| Mineral water | 300 parts; |
| Fresh ginger slices | 12 parts; |

The selenium content of the selenium-enriched wheat whole bud seedlings is: 0.042-±0.005 mg/kg.

The selenium-enriched wheat whole bud seedling is obtained by the following seed breeding method and cultivation method:

A. The breeding method of a wheat seed is as follows:

In a high-altitude pollution-free region, the seed is bred by means of the characteristics of strong illumination and large diurnal temperature difference to form a wheat seed with rich nutrients; after collected, the seed is stored in an environment of 0-4° C.;

B. The cultivation method of the selenium-enriched wheat whole bud seedling is as follows:

a. seed selection: impurities are removed from the seed to eliminate seeds having damaged surfaces and wizened seeds so as to select clean, pollution-free and plump wheat seeds with high sprouting rate;

b. seed soaking: the selected wheat seeds are soaked in an organic selenium seed soaking solution; the organic selenium seed soaking solution comprises the following raw materials in parts by weight: 1000 parts of mineral water and 1-3 parts of organic chelating water-soluble selenium; the water temperature and the time of seed soaking are set according to different seasons; the water temperature in winter is required to be 40-45° C.; the water temperature of seed soaking in other seasons is normal temperature; and the seed soaking time is: 10-13 hours in winter, 6-8 hours in summer and 9-11 hours in spring and autumn; and during seed soaking, the seeds are washed daily twice in summer and once in other seasons.

c. sprouting: after being soaked, the seeds can be sprouted; the seeds are taken out of the organic selenium seed soaking solution, packed with clean ventilated soft cloth and placed at weak light position for sprouting; the seeds are required to be washed with the mineral water daily; then, the seeds are soaked again in the organic selenium seed soaking solution; after being soaked for 1-12 hours, the seeds are packed with the ventilated soft cloth; after 60% of the seeds sprout in 3-5 days, the seeds can be sowed; and the optimal sprouting temperature is 15-25° C.

d. acceleration of the growth of seedlings: seedbed paper soaked with the organic selenium seed soaking solution is laid on a seedling disk; after absorption, the seedbed paper is in a saturation state; the sprouted wheat seeds are uniformly scattered on the seedbed paper; the sowing density in acceleration of the growth of seedlings is: for 250 g of dry wheat seeds, 2-3 plastic disks of 25 cm×30 cm of seeds are sowed; after the seeds are bred, the same seedling disk is placed on the seeds or a piece of same seedbed paper wetted by spraying with a sprinkling can is covered on the seeds to maintain humidity; the seeds are required to be protected from light during acceleration of the growth of seedlings; meanwhile, ventilation of the seedling disk is required; during acceleration of the growth of seedlings, the sprouted seeds are uniformly sprayed with the mineral water daily three to four times in summer and 1 to 2 times in winter; the spraying quantity shall be in such a manner that the seedbed paper at the bottom of the disk is wet without accumulated water; when buds of the wheat bud seedlings grow to 1 cm, the seedbed paper covered on the buds are removed to performing cultivation under exposure to light; the temperature is 15-30° C. during the cultivation; on the next day after exposure to the light, the wheat bud seedlings are sprayed with an organic selenium spraying culture solution; the humidity of the seedbed paper is maintained; the organic selenium spraying culture solution comprises the following raw materials in parts by weight: 1000 parts of mineral water and 0.5-2 parts of kappa-selenocarrageenan; then, the wheat bud seedlings are sprayed daily with mineral water;

e. collection: the growth time of the wheat bud seedlings is controlled as 10-15 days; and wheat whole seedlings are collected when the height of the seedlings is 10-12 cm to obtain the selenium-enriched wheat whole bud seedlings.

The cultivation method of the selenium-enriched wheat whole bud seedling of the present invention is not only suitable for selenium enrichment cultivation of wheat whole bud seedlings, but also suitable for cultivation of many selenium-enriched bud seedling vegetables such as barley bud seedlings, corn bud seedlings, soybean bud seedlings, broad bean seedlings, pea seedlings, green bean seedlings, black bean seedlings, etc.

A preparation method of the selenium-enriched wheat whole bud seedling juice drink comprises the following preparation steps:

step 1: after being collected, the mature selenium-enriched wheat whole bud seedlings and the selenium-enriched wheat seedling leaves are washed with the mineral water for standby;

step 2: the selenium-enriched wheat whole bud seedlings, the selenium-enriched wheat seedling leaves, the mineral water and the fresh ginger slices are put into a juice extractor in proportion, and the extracting time is 1-3 minutes;

step 3: the extracted and filtered selenium-enriched wheat whole bud seedling juice drink is taken out and placed in an environment of 0-4° C. for storage.

What is claimed is:

1. A preparation method of selenium-enriched wheat whole bud seedling juice drink, comprising:
    step 1: preparation of the selenium-enriched wheat whole bud seedling;
    a. seed breeding: breeding a seed by means of characteristics of illumination and diurnal temperature difference; after collected, the seed is stored in an environment of 0-4° C.;
    b. seed selection: removing impurities from the seed to eliminate seeds having damaged surfaces and wizened seeds so as to select clean and pollution-free wheat seeds;
    c. seed soaking: soaking the selected wheat seeds in an organic selenium seed soaking solution; the organic selenium seed soaking solution comprises the following raw materials in parts by weight: 1000 parts of mineral water and 1-3 parts of organic chelating water-soluble selenium; wherein the water temperature and the time of seed soaking are set according to different seasons; the water temperature in winter is required to be 40-45° C.; and the seed soaking time is 10-13 hours in winter; 6-8 hours in summer and 9-11 hours in spring and autumn;
    wherein during seed soaking, the seeds are washed daily twice in summer and once in other seasons;
    d. sprouting: after being soaked, the seeds are sprouted; taking out the seeds of the organic selenium seed soaking solution, packing with clean ventilated cloth and placing at light position for sprouting; the seeds are required to be washed with a mineral water daily; then, soaking the seeds again in the organic selenium seed soaking solution; after being soaked for 1-12 hours, packing the seeds with the ventilated cloth; after 60% of the seeds sprout in 3-5 days, the seeds can be sowed; wherein optimal sprouting temperature is 15-25° C.;
    e. acceleration of the growth of seedlings: laying seedbed paper soaked with the organic selenium seed soaking solution on a seedling disk; after absorption, the seedbed paper is in a saturation state; uniformly scattering the sprouted wheat seeds on the seedbed paper; after the seeds are bred, placing the same seedling disk on the seeds or a piece of same seedbed paper wetted by spraying with a sprinkling can is covered on the seeds to maintain humidity; the seeds are required to be protected from light during acceleration of the growth of seedlings; meanwhile, ventilation of the seedling disk is required; during acceleration of the growth of seedlings, the sprouted seeds are uniformly sprayed with the mineral water daily at least once; spraying quantity shall be in such a manner that the seedbed paper at the bottom of the disk is wet without accumulated water; when buds of the wheat bud seedlings grow to 1 cm, the seedbed paper covered on the buds are removed to performing cultivation under exposure to light; the temperature is 15-30° C. during cultivation; on the next day after exposure to the light, spraying the wheat bud seedlings with an organic selenium spraying culture solution; the humidity of the seedbed paper is maintained; the organic selenium spraying culture solution comprises following raw materials in parts by weight: 1000 parts of mineral water and 0.5-2 parts of kappa-selenocarrageenan; then, the wheat bud seedlings are sprayed daily with mineral water;

wherein sowing density in acceleration of the growth of seedlings is: for 250 g of dry wheat seeds, 2-3 plastic disks of 25 cm×30 cm of seeds are sowed;

wherein during acceleration of the growth of seedlings, the sprouted seeds are uniformly wetted daily three to four times in summer and 1 to 2 times in winter;

f. collection: growth time of the wheat bud seedlings is controlled as 10-15 days; and wheat whole seedlings are collected when height of the seedlings is 10-12 cm to obtain the selenium-enriched wheat whole bud seedlings;

step 2: after being collected, washing mature selenium-enriched wheat whole bud seedlings with the mineral water for standby;

step 3: putting the selenium-enriched wheat whole bud seedlings, the mineral water and ginger slices into a juice extractor in proportion, and extracting time is 1-3 minutes;

wherein, the selenium-enriched wheat whole bud seedling juice drink, characterized by comprising following raw materials in parts by weight:

| | |
|---|---|
| selenium-enriched wheat whole bud seedlings | 60-120 parts; |
| mineral water | 250-1000 parts; |
| ginger slices | 5-15 parts; | wherein selenium content of the selenium-enriched wheat whole bud seedlings is: 0.15-0.25 mg/kg;

wherein the selenium content of the selenium-enriched wheat whole bud seedling juice is: 0.01-0.05 mg/L;

step 4: placing the selenium-enriched wheat whole bud seedling juice drink in an environment of 0-4° C. for storage.

* * * * *